United States Patent [19]

Matsuo et al.

[11] Patent Number: 4,703,104
[45] Date of Patent: Oct. 27, 1987

[54] PREPARATION OF CYANOARYL ETHER COPOLYMER

[75] Inventors: Shigeru Matsuo; Tomoyoshi Murakami; Ryuichi Takasawa, all of Sodegaura, Japan

[73] Assignee: Idemitsu Kosan Company Limited, Tokyo, Japan

[21] Appl. No.: 828,215

[22] Filed: Feb. 10, 1986

[30] Foreign Application Priority Data

Feb. 22, 1985 [JP] Japan .................................. 60-32741
Mar. 29, 1985 [JP] Japan .................................. 60-63933

[51] Int. Cl.$^4$ .......................................... C08G 65/40
[52] U.S. Cl. .................................... 528/211; 528/125; 528/128; 528/171; 528/173; 528/174; 528/206; 528/208; 528/210
[58] Field of Search ............... 528/211, 206, 208, 210, 528/171, 173, 174, 125, 128

[56] References Cited

U.S. PATENT DOCUMENTS 3,730,946  5/1973  Heath et al. ........................ 528/184

FOREIGN PATENT DOCUMENTS 0163928  8/1985  Japan .................................. 528/211

Primary Examiner—Harold D. Anderson
Attorney, Agent, or Firm—Frishauf, Holtz, Goodman & Woodward

[57] ABSTRACT

There are disclosed a novel copolymer comprising having recurring unit represented by the formula:

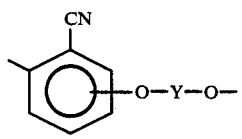

(I)

wherein Y represents a phenylene group or a naphthylene group, with a recurring number of k and a recurring unit represented by the formula:

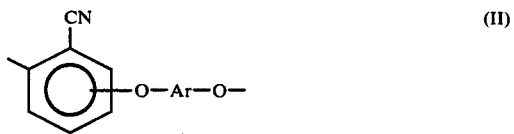

(II)

wherein Ar represents a divalent aryl group,
with a recurring number of l, a value of k/(k+l) is 0.5 to 0.97 and having a reduced viscosity [$\eta_{sp/c}$] of 0.3 dl/g or higher as measured in p-chlorophenol solution at a concentration of 0.2 g/dl at 60° C., and a process for producing the novel copolymer comprising the steps of:

(a) reacting dihalogenobenzonitrile represented by the following formula:

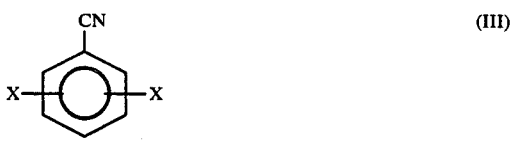

(III)

wherein X represents a halogen atom,
an alkali metal salt of hydroquinone or dihydroxynaphthalene represented by the following formula:

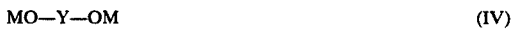

MO—Y—OM  (IV)

wherein Y represents a phenylene group or a naphthylene group and M represents an alkali metal,
and an alkali metal salt of a divalent phenol represented by the formula:

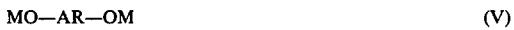

MO—AR—OM  (V)

wherein in Ar represents a divalent aryl group and M represents an alkali metal,
in the presence of a solvent, and (B) treating the obtained reaction product with water or an alcohol.

2 Claims, No Drawings

PREPARATION OF CYANOARYL ETHER COPOLYMER

BACKGROUND OF THE INVENTION

This invention relates to a novel copolymer and a process for producing the same, and more particularly, to a novel copolymer which is excellent in heat resistance and capable of having its heat resistance controlled, and good in mechanical strength, solvent resistance and flame resistance and also excellent in mechanical properties, particularly in elongation and impact strength compared to the conventional cyanoaryl ether polymer, and to a process for producing the same.

There are disclosed a polycyanoaryl ether having various structures in Japanese Laid-Open Patent Publication No. 14270/1972. However, there is a disadvantage that these polycyanoaryl ethers are insufficient in heat resistance.

Further, in Japanese Laid-Open Patent Publication No. 206433/1984, there is disclosed a cyanoaryl ether polymer obtained by dihalogenobenzonitrile and hydroquinone or biphenol as starting materials. While this polymer is excellent in mechanical strength and heat resistance, its heat resistance cannot be freely controlled and thus it has disadvantage that it cannot flexibly cope with various requests in the various fields of use. Further, such a polymer is not necessarily sufficient in view of characteristics such as mechanical characteristics required for raw materials of electronics and electrical devices or mechanical parts. Accordingly, it has earnestly been desired to develop a cyanoaryl ether polymer having excellent mechanical characteristics compared to that of the conventional one.

SUMMARY OF THE INVENTION

An object of this invention is to solve the problems as mentioned above and to provide a novel copolymer which is excellent in heat resistance and capable of having its heat resistance controlled, and good in mechanical strength, solvent resistance and flame resistance and also excellent in mechanical properties, particularly in elongation and impact strength compared to the conventional cyanoaryl ether polymer, and to a process for producing the same.

The novel copolymer of the present invention comprises a recurring unit represented by the formula:

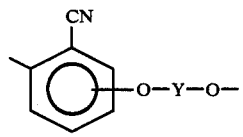
(I)

wherein Y represents a phenylene group or a naphthylene group,
with a recurring number of k, and a recurring unit represented by the formula:

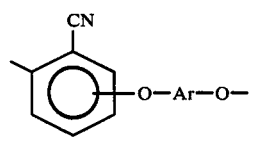
(II)

wherein Ar represents a divalent aryl group other than the particular Y present in formula (I),
with a recurring number of l, the value of $k/(k+l)$ is 0.5 to 0.97, and having a reduced viscosity $[\eta_{sp/c}]$ of 0.3 dl/g or higher as measured in p-chlorophenol solution at a concentration of 0.2 g/dl at 60° C.

Further, the process for producing the novel copolymer of the present invention comprises the steps of:

(A) reacting dihalogenobenzonitrile represented by the following formula:

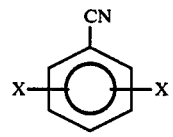
(III)

wherein X represents a halogen atom,
an alkali metal salt of hydroquinone or dihydroxynaphthalene represented by the following formula:

MO—Y—OM (IV)

wherein Y represents a phenylene group or a naphthylene group and M represents an alkali metal,
and an alkali metal salt of a divalent phenol represented by the formula:

MO—Ar—OM (V)

wherein Ar represents a divalent aryl group other than the particular Y present in formula (IV) and M represents an alkali metal,
in the presence of a solvent, and (B) treating the obtained reaction product with water or an alcohol.

DESCRIPTION OF THE PREFERRED EMBODIMENTS

In the novel copolymer of the present invention, one of the recurring units represented by the formula (I) or a linked chain comprising a plurality of these units linked appropriately in a straight chain, and one of the recurring units represented by the formula (II) or a linked chain comprising a plurality of these units linked appropriately in a straight chain, are linked successively to one another disorderly or orderly in a straight chain to constitute the copolymer.

In the novel copolymer of the present invention, the following copolymers are preferred:

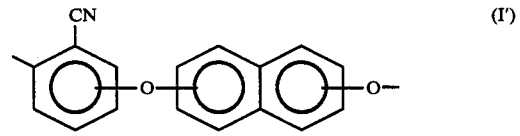
(I')

with a recurring number of k', and a recurring unit represented by the formula:

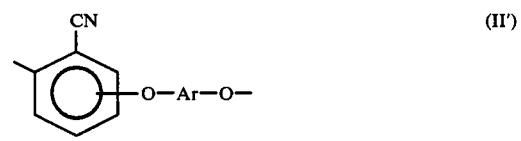
(II')

wherein Ar represents a divalent aryl group, provided that

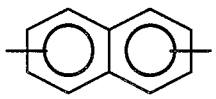

is excluded,
with a recurring number of l', a value of k'/(k'+l') is 0.5 to 0.97; and

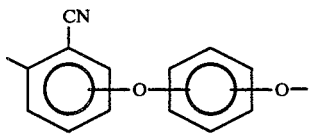 (I")

with a recurring number of k", and a recurring unit represented by the formula:

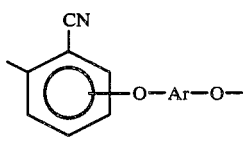 (II")

wherein Ar represents at least one selected from the group consisting of

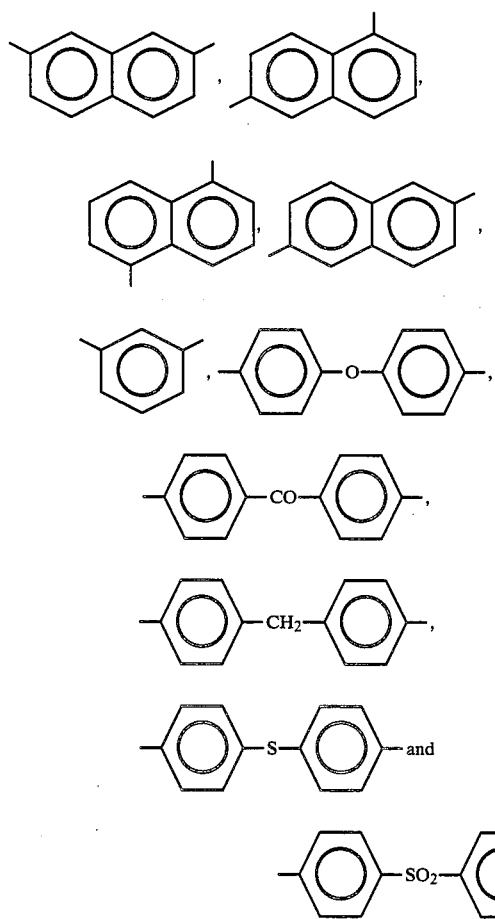

with a recurring number of l", a value of k"/(k"+l") is 0.5 to 0.97.

The total numbers k and l of the respective recurring units are required to be integers satisfying the relationship of $0.5 \leq k/(k+l) \leq 0.97$. If k/(k+l) is less than 0.5, the heat resistance will be lowered and thus it is unfavorable. On the other hand, if k/(k+l) exceeds 0.97, while the heat resistance is excellent, improvement in elongation and impact resistance could not be accomplished and moldability is lowered. Preferably, the relationship of $0.8 \leq k/(k+l) \leq 0.95$ should be satisfied. In the present invention, the value of the above k/(k+l) affects to the heat resistance. Namely, the heat resistance of the copolymer, particularly the glass transition temperature becomes high with increase of the value of k/(k+l), and thus by setting the value of k/(k+l) to a desired value, the heat resistance of the copolymer can be controlled.

The copolymer of the present invention is blocked at terminal ends thereof with a hydrogen atom, a halogen atom,

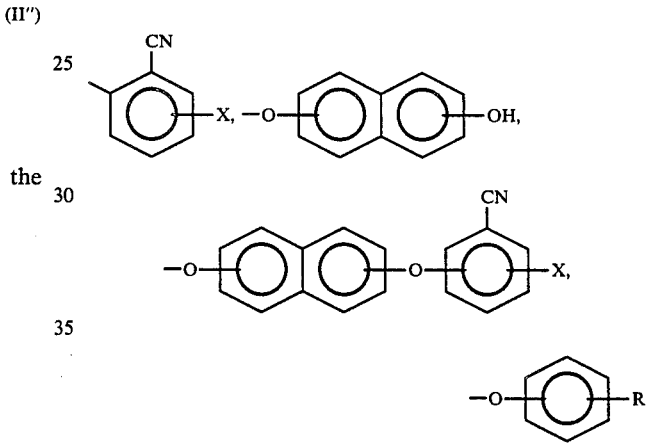

wherein X represents a halogen atom, and R represents a hydrogen atom, an alkyl group having 1 to 10 carbon atoms, an aryl group, an aralkyl group or a cyano group,
and the like.

The copolymer of the present invention also has a molecular weight corresponding to the reduced viscosity $[\eta_{sp/c}]$ which is 0.3 dl/g or more as measured in parachlorophenol solution at a polymer concentration of 0.2 g/dl at 60° C. If $\eta_{sp/c}$ is lower than 0.3 dl/g, the mechanical strength and heat resistance of the copolymer are lowered and it is poor for practical use.

The copolymer of the present invention can be prepared as described below.

Namely, the first step is formulating a mixture of dihalogenobenzonitrile represented by the formula (III), an alkali metal salt of hydroquinone or dihydroxynaphthalene represented by the formula (IV) and an alkali metal salt of divalent phenol represented by the formula (V) at a proportion as mentioned below and dissolving them in a solvent as mentioned below, and then reacting them at conditions as mentioned below.

In the compound of the formula (III), as halogen X, F and Cl are particularly preferred, and specific compounds may include 2,6-dichlorobenzonitrile, 2,4-dichlorobenzonitrile, 2,6-difluorobenzonitrile, 2,4-difluorobenzonitrile, and the like.

In the each of compounds of the formulae (IV) and (V), M may be any of alkali metals, and Na and K are particularly preferred.

Further, in the compound of the formula (V), Ar is a divalent aryl group, including, for example,

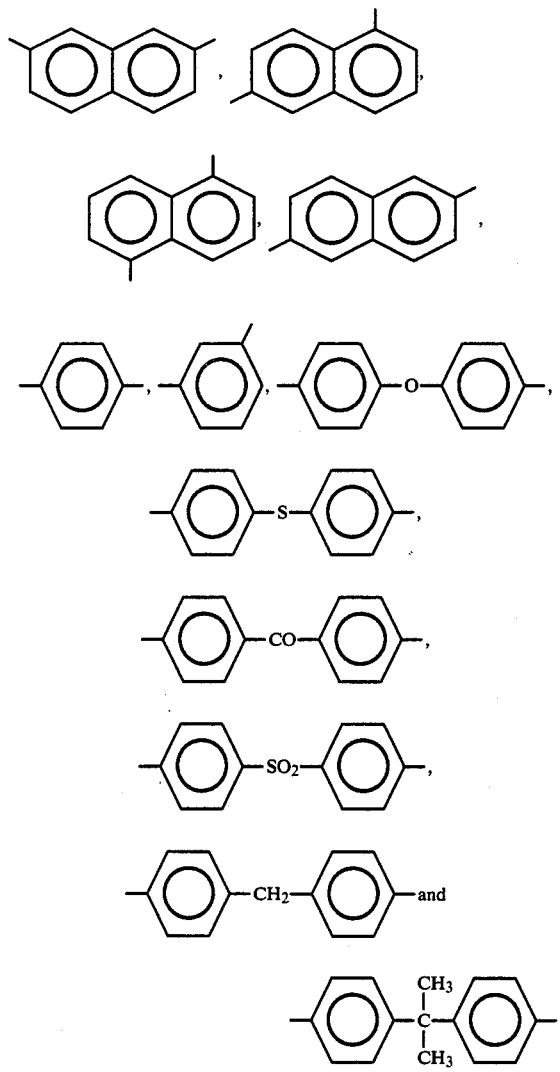

and particularly preferred are

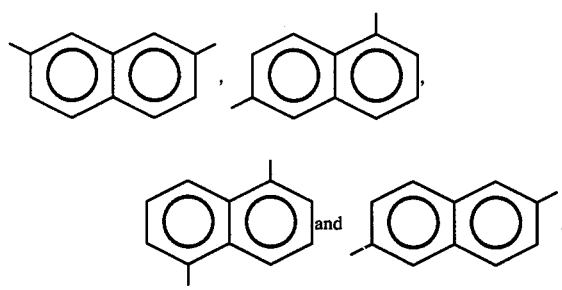

Each of the compounds of the formulae (IV) and (V) are prepared by neutralization reaction of an alkali metal salt and hydroquinone or dihydroxynaphthalene or an alkali metal salt and a divalent phenol having the above Ar. As the alkali metal salts to be used at this time, there may be mentioned potassium carbonate, potassium hydroxide and the like.

For carrying out the reaction, for example, hydroquinone or dihydroxynaphthalene, the divalent phenol having the above Ar and the alkali metal salt may be added all together in the reaction system without using the compounds of the formulae (IV) and (V) at first. In this case, the compounds of the formulae (IV) and (V) are each produced in the reaction system in accordance with proceeding of the reaction.

An amount of each of the compounds to be formulated is, when the formulating amounts of the compounds of the formulae (III), (IV) and (V) are designated as j' mole, k' mole and l' mole, respectively, the relationship of $j'=k'+l'$ should be satisfied. Further, the amount of j' being slightly in excess of $(k'+l')$ is preferred since polymerization is promoted.

Next, the above k' and l' should be required to satisfy the relationship of $0.5 \leq k'/(k'+l') \leq 0.97$ in response to the relationship of the aforesaid $0.5 + k/(k+l) \leq 0.97$.

The reaction is carried out in a solvent. The solvent employed may include neutral polar solvent such as dimethylsulfoxide, sulforane, diphenylsulfone, dimethylacetamide, N-methylpyrrolidone and the like, and it can be used in an amount sufficient to dissolve each of the compounds of the formulae (III), (IV) and (V).

The reaction temperature is generally 100° to 350° C., preferably 150° to 280° C., more preferably 180° to 210° C., and the reaction time may be 0.1 to 8 hours, preferably 1 to 6 hours, more preferably 1 to 3 hours. The reaction may be conducted either under ambient pressure or under slight pressurization.

In the present invention, during this stage, it is preferred to add a monovalent phenol represented by the following formula as the molecular weight controller:

wherein R represents a hydrogen atom, an alkyl group having 1 to 10 carbon atoms, an aryl group, an aralkyl group or a cyano group.

In the above formula (VI), R may preferably include a methyl group, $(CH_3)_3C-$, $CH_3(CH_2)_7-$,

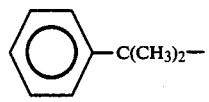

and others.

An amount of the molecular weight controller may be decided depending upon the molecular weight of the copolymer to be obtained.

In the next step, the reaction product obtained through the above step is treated with water or an alcohol to block the terminals of the copolymer through elimination of the alkali metal at the terminals thereof with H or OH. As the alcohols to be used, methanol or ethanol is preferred. Further, as the treating method, the above reaction product may be thrown into water or the alcohol.

EXAMPLE 1

Into an inner volume of 300-ml separable flask equipped with a fractionating equipment, a stirrer and an argon gas blowing pipe, 17.20 g (0.1 mole) of 2,6-dichlorobenzonitrile, 14.273 g (0.09 mole) of 2,7-dihydroxynaphthalene, 1.09 g (0.01 mole) of hydroquinone, 16.585 g (0.12 mole) of potassium carbonate, 100 ml of sulforane and 50 ml of toluene were charged, the mixture was stirred while blowing argon gas and reacted at 160° C. for 1.5 hours and further by elevating the temperature to 190° C. for 2 hours. After completion of the polymerization reaction, the resulting product was thrown into methanol to precipitate and recover the copolymer. After the precipitates were crushed by using Blender produced by Warning Co., Ltd., followed by washing with 2 l of boiling water and 2 l of hot methanol, successively and finally dried under reduced pressure at 120° C. for 8 hours. The yielded amount of the resulting copolymer is 25.2 g and the yield is 100%.

Further, the reduced viscosity $[\eta_{sp/c}]$ was 1.25 dl/g which was measured in p-chlorophenol solution at a concentration of 0.2 g/dl at 60° C. (in the following Examples, the measurement was carried out in the same manner as the above) and the value of k/(k+1) was 0.9.

A film was prepared by pressing this copolymer, and an infrared absorption spectrum (IR) analysis was carried out by using this film. As a result, absorptions was found based on C-H bondings of a benzene ring at a portion of 3030 cm$^{-1}$ and 830 cm$^{-1}$, C-C bondings of a benzene ring at 1590 cm$^{-1}$, an aromatic ether bonding at 1240 cm$^{-1}$ and an absorption based on the presence of a nitrile group at 2220 cm$^{-1}$.

As to the thermal properties of the copolymer, glass transition temperature (Tg) was 214° C., melting point (Tm) was 308° C., and thermal decomposition initiating temperature (Td) was 507° C. (in air).

The following mechanical properties of the copolymer film was measured by using Autograph IS-5000 (trade name) produced by Shimazu Seisakusho K.K. as a tension tester.

Yield strength (measured according to ASTM D 638).

Fracture strength (measured according to ASTM D 638).

Elasticity (measured according to ASTM D 638).

Elongation (measured according to ASTM D 638).

As results, when tension speed was 1 mm/min., the yield strength was 1300 kg/cm$^2$, fracture strength was 1100 kg/cm$^2$, elasticity was 23000 kg/cm$^2$ and elongation was 50%.

Next, when the solvent resistances of the copolymer were measured, it was insoluble in acetone, ethanol, toluene, methylene chloride and chloroform.

Further, after the film of this copolymer was exposed to fire of a lighter for 10 seconds, the film was moved away from the fire and the fire went out at once and no melting away was observed, and thus the film has good flame resistance.

EXAMPLE 2

Copolymer was prepared in the same manner as in Example 1 except that the amount of 2,7-dihydroxynaphthalene to be used in Example 1 was replaced with 9.1 g (0.06 mole) and the amount of hydroquinone to be used was replaced with 4.40 g (0.04 mole).

As a result, the yielded amount of copolymer was 23.9 g (Yield: 100%), the reduced viscosity $[\eta_{sp/c}]$ was 1.08 dl/g and the value of k/(k +1) was 0.6. Results of IR analysis were the same as in Example 1.

As to thermal properties of the copolymer, Tg was 204° C. and Td was 526° C.

As to mechanical properties, yield strength was 1350 kg/cm$^2$, a fracture strength was 1400 kg/cm$^2$, elasticity was 25000 kg/cm$^2$ and elongation was 90%.

As to the solvent resistance and flame resistance of this copolymer, the same results as in Example 1 were obtained.

EXAMPLE 3

Copolymer was prepared in the same manner as in Example 1 except that the hydroquinone was replaced with 2.257 g (0.01 mole) of 2,2-bis(4-hydroxyphenyl)-propane as the divalent phenol.

As a result, the yielded amount of copolymer was 26.4 g (Yield: 100%) the reduced viscosity $[\eta_{sp/c}]$ was 1.34 dl/g and the value of k/(k+1) was 0.9. As results of IR analysis, in addition to each absorption in Example 1, an absorption based on an isopropyl group was observed at a position of 2950 cm$^{-1}$.

As to thermal properties of the copolymer, Tg was 212° C., Tm was 315° C. and Td was 503° C.

As to mechanical properties, yield strength was 1300 kg/cm$^2$, fracture strength was 1100 kg/cm$^2$, elasticity was 26700 kg/cm$^2$ and elongation was 25%.

As to the solvent resistance and flame resistance of this copolymer, the same results as in Example 1 were obtained.

EXAMPLE 4

Copolymer was prepared in the same manner as in Example 1 except that hydroquinone was replaced with 2.47 g (0.01 mole) of 4,4'-dihydroxydiphenylsulfone as the divalent phenol.

As a result, the yielded amount of copolymer was 26.6 g (Yield: 100%), the reduced viscosity $[\eta_{sp/c}]$ was 0.48 dl/g and the value of k/(k+1) was 0.9. Results of IR analysis were the same as in Example 1.

As to thermal properties of the copolymer, Tg was 214° C., Tm was 511° C. and Td was 519° C.

As to mechanical properties, yield strength was 1040 kg/cm$^2$, fracture strength was 1100 kg/cm$^2$, elasticity was 28000 kg/cm$^2$ and elongation was 40%.

As to the solvent resistance and flame resistance of this copolymer, the same results as in Example 1 were obtained.

EXAMPLE 5

Into an inner volume of 500-ml separable flask equipped with a fractionating equipment, a stirrer and an argon gas blowing pipe, 17.201 g (0.1 mole) of 2,6-dichlorobenzonitrile, 1.586 g (0.01 mole) of 2,7-dihydroxynaphthalene, 9.811 g (0.09 mole) of hydroquinone, 16.585 g (0.12 mole) of potassium carbonate, 200 ml of sulforane and 100 ml of toluene were charged, the mixture was stirred while blowing argon gas and reacted at 160° C. for 1.5 hours and further by elevating the temperature to 200° C. for 5 hours. After completion of the polymerization reaction, the resulting product was thrown into water to precipitate and recover the copolymer. After the precipitates were crushed by using Blender produced by Warning Co., Ltd., followed by washing three times with 3.5 l of boiling water and finally dried under reduced pressure at 140° C. over night, the yielded amount of the resulting copolymer was 21.3 g (Yield: 100%).

In order to investigate the molecular weight of the resulting copolymer, the reduced viscosity [$\eta_{sp/c}$], and the value of k/(k+l) were measured, and these results are shown in Table 1.

Next, by using this copolymer, a molded product was prepared according to injection molding, and mechanical properties were measured by using this molding product.

Namely, the properties at a tension speed of 1 mm/min. were measured and the results are shown in Table 1.

Further, measurements of Izod impact resistance (measured according to ASTM D 256 and using a test piece with notch) were carried out, and the results are shown in Table 1. Thermal properties were also measured and the results are shown in Table 1.

EXAMPLE 6

Copolymer was prepared in the same manner as in Example 5 except for using 10.461 g (0.095 mole) of hydroquinone and 0.801 g (0.005 mole) of 2,7-dihydroxynaphthalene and the measurements were carried out in the same manner. The yielded amount of the resulting copolymer was 21.3 g (Yield: 100%). Properties of the resulting copolymer are shown in Table 1.

EXAMPLE 7

Copolymer was prepared in the same manner as in Example 5 except for replacing 2,7-dihydroxynaphthalene with 1.602 g (0.01 mole) of 1,6-dihydroxynaphthalene and the measurements were carried out in the same manner. The yielded amount of the resulting copolymer was 21.4 g (Yield: 100%). Properties of the resulting copolymer are shown in Table 1.

EXAMPLE 8

Copolymer was prepared in the same manner as in Example 5 except for replacing 2,7-dihydroxynaphthalene with 0.551 g (0.005 mole) of resorcin and the measurements were carried out in the same manner. The yielded amount of the resulting copolymer was 20.9 g (Yield: 100%). Properties of the resulting copolymer are shown in Table 1.

COMPARATIVE EXAMPLE

Copolymer was prepared in the same manner as in Example 5 except for using 11.01 g (0.1 mole) of hydroquinone without using 2,7-dihydroxynaphthalene and the measurements were carried out in the same manner. The yielded amount of the resulting copolymer was 20.9 g (Yield: 100%). Properties of the resulting copolymer are shown in Table 1.

The results as mentioned above are summarized in Table 1.

TABLE 1

| | Example 5 | Example 6 | Example 7 | Example 8 | Comparative example |
|---|---|---|---|---|---|
| Kind of Ar | naphthalene | methylnaphthalene | naphthalene | methylphenyl | — |
| $\frac{k}{k+l}$ | 0.9 | 0.95 | 0.9 | 0.9 | 1.0 |
| Reduced viscosity [$\eta sp/c$] (dl/g) | 1.29 | 1.46 | 1.45 | 1.51 | 1.49 |
| Yield strength (Kg/cm$^2$) | 1200 | 1150 | 1300 | 1250 | — |
| Fracture strength (Kg/cm$^2$) | 1150 | 1300 | 1250 | 1200 | 990 |
| Elasticity (Kg/cm$^2$) | 25000 | 27500 | 27000 | 28000 | 22000 |
| Elongation (%) | 50 | 55 | 20 | 25 | 18 |
| Izod impact resistance (Kg.cm/cm) | 50 | 50 | 55 | 45 | 30 |
| Tg (°C.) | 183 | 183 | 184 | 179 | 175 |
| Tm (°C.) | 332 | 328 | 340 | 339 | 380 |
| Td (in air) (°C.) | 503 | 500 | 490 | 495 | 500 |

As seen from the above explanation, the copolymer of the present invention has an excellent heat resistance and is capable of having its heat resistance controlled. Further, mechanical strength, solvent resistance and flame resistance of the copolymer are also good and particularly the copolymer of the present invention is superior to the conventional cyanoaryl ether polymers in the mechanical strength, particularly elongation and impact resistance and thus it is available for use as raw materials of electronics and electrical devices or mechanical parts.

We claim:

1. A process for producing a cyanoaryl ether copolymer which comprises the steps of:

(A) reacting dihalogenobenzonitrile represented by the following formula:

(III)

wherein X represents a halogen atom, an alkali metal salt of a hydroquinone or a dihydroxynaphthalene represented by the formula:

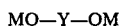 (IV)

wherein M represents an alkali metal and Y represents a phenylene group or a naphthylene group, and an alkali metal salt of a divalent phenol represented by the following formula:

 (V)

wherein M represents an alkali metal and Ar is different from Y and represents a divalent group selected from the group consisting of:

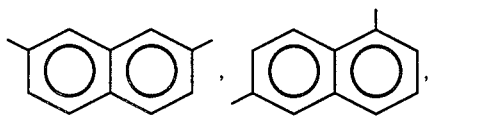

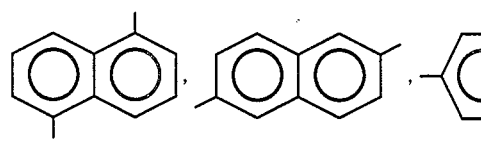

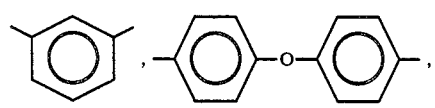

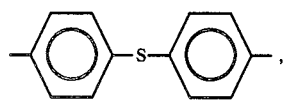

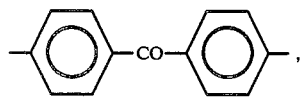

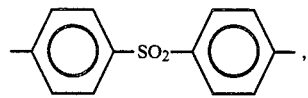

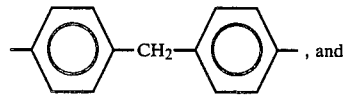, and

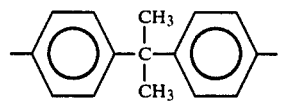

with the amount of the compound represented by the formula (IV) to the total amount of the compounds represented by the formulae (IV) and (V) being 0.5 to 0.97 in terms of molar ratio, provided that when one of Y and Ar represents the phenylene group and the other represents the naphthylene group, the amount of the compound represented by the formula (IV) to the total amount of the compounds represented by the formulae (IV) and (V) being 0.03 to 0.97, and the moles of the compound represented by the formula (III) being equal to or slightly in excess of the total moles of the compounds represented by the formulae (IV) and (V), in the presence of a solvent and at 100° to 350° C., and (B) treating the obtained reaction product with water or an alcohol;

said copolymer has a reduced viscosity [$\eta_{sp/c}$] of 0.3 dl/g or higher as measured in p-chlorophenol solution at a concentration of 0.2 g/dl at 60° C. and comprises a recurring unit represented by the formula:

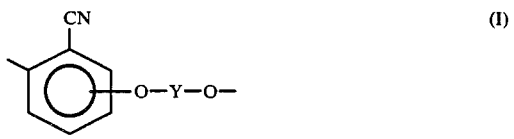 (I)

wherein Y represents a phenylene group or a naphthylene group, and a recurring unit represented by the formula:

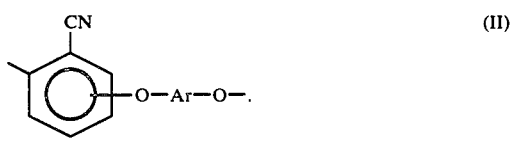 (II)

2. The process of claim 1, wherein a monovalent phenol of the formula:

 (VI)

wherein R represents a hydrogen atom, an alkyl group having 1 to 10 carbon atoms, an aryl group, an aralkyl group or a cyano group
is added and reacted as a molecular weight controller with the copolymer.

* * * * *